United States Patent [19]

Smith et al.

[11] Patent Number: 5,011,115
[45] Date of Patent: Apr. 30, 1991

[54] SELF SUPPORTING PLUG FOR A DOUBLE BLOCK AND BLEED PLUG VALVE

[75] Inventors: Gordon M. Smith, Brookshire; Hans M. Van Der Wiel, Fulshear, both of Tex.

[73] Assignee: Johnston Pump/General Valve Inc., Brookshire, Tex.

[21] Appl. No.: 459,224

[22] Filed: Dec. 29, 1989

[51] Int. Cl.⁵ .............................................. F16K 5/04
[52] U.S. Cl. .................................. 251/161; 251/188
[58] Field of Search ............... 251/160, 161, 162, 163, 251/166, 167, 188

[56] References Cited

U.S. PATENT DOCUMENTS

| | | | |
|---|---|---|---|
| 426,635 | 4/1890 | Burr | 251/188 |
| 733,905 | 7/1903 | Erdman | 251/188 |
| 2,372,869 | 4/1945 | Wheatley, Sr. | 251/118 |
| 2,596,075 | 5/1952 | Heinen | 251/166 |
| 2,612,340 | 9/1952 | Laurent | 251/161 X |
| 3,011,513 | 12/1961 | Heinen | 251/166 X |
| 3,362,433 | 1/1968 | Heinen | 251/163 X |

FOREIGN PATENT DOCUMENTS 337913  10/1919  Fed. Rep. of Germany ...... 251/161

Primary Examiner—John C. Fox

[57] ABSTRACT

Self supporting, non-lubricated retractable seal double block and bleed plug valve wherein an improved plug configuration provides direct bearing surface support for the plug along at least a portion of the radial surface of the plug. The remaining radial surface of the plug may be optionally relieved to avoid scuffing the swept seating area of the interior valve body surface. By utilizing the novel plug configuration for direct plug bearing support, the present invention obviates the need for a lower trunnion and does away with the need for high load-bearing bushings. In all other respects, the operation of a plug valve, utilizing the plug of the present invention, remains substantially the same as it would be for a prior art plug valve. In fact, it is possible to substitute a novel plug configuration of the present invention for a prior art plug configuration for retrofitting existing valves of the type herein disclosed.

4 Claims, 4 Drawing Sheets

SELF SUPPORTING PLUG FOR A DOUBLE BLOCK AND BLEED PLUG VALVE

BACKGROUND OF THE INVENTION

1. Field of the Invention

The present invention relates generally to retractable seal double-block and bleed plug valves and more specifically to plug valves of that type in which the plug is designed to be self-supporting thereby obviating the usual requirement for supporting the plug by means of a trunnion and bushings.

2. Prior Art

Double block and bleed plug valves are well known in the art as exemplified by U.S. Pat. No. 3,011,513 issued to Heinen in 1961. Their positive sealing and superior flow characteristics are high advantageous for controlling the flow of fluids. Plug-type valves are generally the type in which a valve body is provided with a pair of axially aligned ports which are connected to incoming and outgoing fluid lines for movement of the fluid under pressure therethrough. Typically, a plug is adapted to selectively rotate within the main chamber of the valve to either provide a continuous channel between the incoming and outgoing coaxial ports when the valve is in the open position or a fluid-tight seal in one or both of the coaxial interconnecting ports when the valve is in the closed position.

Heinen discloses a centrally located cylindrical plug disposed within the valve chamber and provided with an upwardly extending shaft or trunnion which extends through the upper portion of the valve body and a downwardly extending shaft or trunnion which is received and terminates within the bottom plate of the valve body. As is well-known in the art, such trunnions assure the coaxial stability of the rotatable plug while also permitting vertical motion of the plug to allow seating and unseating of the valve slips as a result of the interaction of tapered flat surfaces of the plug and the slips.

The plugs of such valves are generally supporting by means of bushings which are in turn supported by the valve bonnet and lower plate. The bushings support the plug by means of the trunnions which extend above and below the plug. Unfortunately, the presence of a lower trunnion in particular makes it impossible to provide a flat lower body plate, thereby requiring an increased size in the overall valve body. Furthermore in such conventional plug type valves, the position of the plug within the body is dictated by the position of the trunnions which, int urn, is dictated by the locations of the bushings which are, in turn, dictated by the positions of the bonnet and lower plate which are all, in turn, dictated by the shape of the body. Consequently, plug location is not always possible to optimize for efficient valve operation.

Furthermore, the conventional design of plug type valves requires that the stem or trunnion be structurally stiff in order to support tremendous side loads and that they be hardfaced in order to withstand the engagement with a bearing surface. Furthermore, the bonnet and lower plate of the valve body must be relatively thick in order to provide significant structural support for the upper and lower bushings respectively, both of which must bear a substantial side load, particularly when the valve is in the closed position.

Clearly from the above noted disadvantages, it would be highly desirable to provide a self-supporting plug which obviates the requirement of conventional plug type valves for being supported by separate bushings, a lower trunnion and larger, heavier body members, all of which make the valve larger and more cumbersome and more expensive.

Relevant prior art known to the applicants includes the following:

66,657, Westlake;
178,312, Leland;
223,486, Cushing;
249,046, Hilliard;
370,780, Grossman;
452,188, Moore;
543,693, Keyes;
558,708, Baldwin;
565,730, Foote;
580,940, Hambleton;
615,616, Glauber;
745,316, Blake;
931,155, Smith;
1,572,678, Pordon.

U.S. Pat. No. 223,486 to Cushing is directed to what is termed a stop-cock. A plug B seats within a body A. A nut C acts as a bushing to hold the shoulder A.

U.S. Pat. No. 178,312 to Leland is directed to a combined stop-cock and T-joint. A plug D interfaces with the body.

U.S. Pat. No. 615,616 to Blauber is directed to a mechanism for securing washers on plug valves. A plug B interfaces with a casing A.

U.S. Pat. No. 452,188 to Moore is directed to a faucet type valve system and provides for a direct interface of the plug with a main body. The bottom portion may constitute a bushing F in the form of a washer.

There is apparently no prior art disclosure of a double block and bleed plug valve of the type shown in the Heinen patent and which employs a self-supporting plug to obviate a lower trunnion and bushings to bear the side loads.

SUMMARY OF THE INVENTION

In the present invention the plug is supported directly by the body, thereby obviating the requirement for upper and lower bushings and a lower trunnion. Specific areas of the novel plug of the present invention are relieved to prevent scuffing of the body bore in critical sealing areas. The plug is made by casting and then the area of the plug designed to support the plug is machined to be only slightly smaller than the body bore, thereby allowing axial and rotational movement, but restricting radial movement. Thus the plug is supported directly by the body as opposed to the prior art techniques for supporting the plug by using trunnions and bushings.

Significant advantages of this novel configuration include the following:

1. The upper stem used to control the position of the plug no longer need be structurally stiff in order to support tremendous side loads;
2. The upper trunnion no longer need be hard-faced because it is no longer a bearing surface;
3. There is no longer any need for a lower trunnion;
4. The removal of the lower trunnion makes it possible to place a vertically directed hole in the lower plug area to continuously purge the lower body of any trapped sediment;

5. There is no longer any requirement for upper or lower bushings;

6. The bonnet and lower plate of the valve body may be thinner, since neither needs to surround a bushing;

7. The lower plate may be flat, thereby reducing the overall height of the valve body;

8. The stem used to control the position of the plug may be small, thereby allowing for improved packing gland arrangement and improved valve sealing capability;

9. The flow area between the body and the plug is reduced, thereby minimizing short term throttle effects observed during opening of the valve;

10. The plug is held more rigidly in place;

11. The plug location may be made more directly dependent upon the shape and size of the valve body without consideration for the need to locate trunnions and bushings, which is a requirement of the prior art;

12. The plug is larger in diameter than prior art bushings and this allows for more bearing area and increased life; and 13. The novel improvement of the present invention permits new plugs having the bearing surface and relieved configuration described herein to be used in old valves, with or without an optional substitution of the lower plate to make the overall valve body shorter in height.

OBJECTS OF THE INVENTION

It is therefore a principal object of the present invention to provide an improved retractable seal double block and bleed plug valve wherein the plug is supported radially, directly by the body for axial and rotational movement therein, thereby obviating the prior art requirement for bushings and a lower trunnion.

It is an additional object of the present invention to provide an improved retractable seal double block and bleed plug valve wherein a unique plug shape obviates the prior art requirement for upper and lower bushings and a lower trunnion thereby reducing the overall size and cost of manufacture of the valve.

It is still an additional object of the present invention to provide a new and highly advantageous plug for use in retractable seal double block and bleed plug valves, the plug being reshaped to provide upper and lower bearing surfaces to directly engage the inner body surface while permitting rotational and axial engagement therebetween for operation of the plug valve in a conventional manner.

It is still an additional object of the present invention to provide an improved plug for a retractable seal double block and bleed plug valve wherein the improvement comprises the use of bearing surfaces directly on the plug body combined with the use of relieved areas along the plug radial surface, adjacent and ahead of the waterway to prevent scuffing of the body bore in critical sealing areas.

BRIEF DESCRIPTION OF THE DRAWINGS

The aforementioned objects and advantages of the present invention, as well as additional objects and advantages thereof will be more fully understood hereinafter as a result of a detailed description of a preferred embodiment of the invention when taken in conjunction with the following figures in which.

DETAILED DESCRIPTION OF A PREFERRED EMBODIMENT

Figure 1:
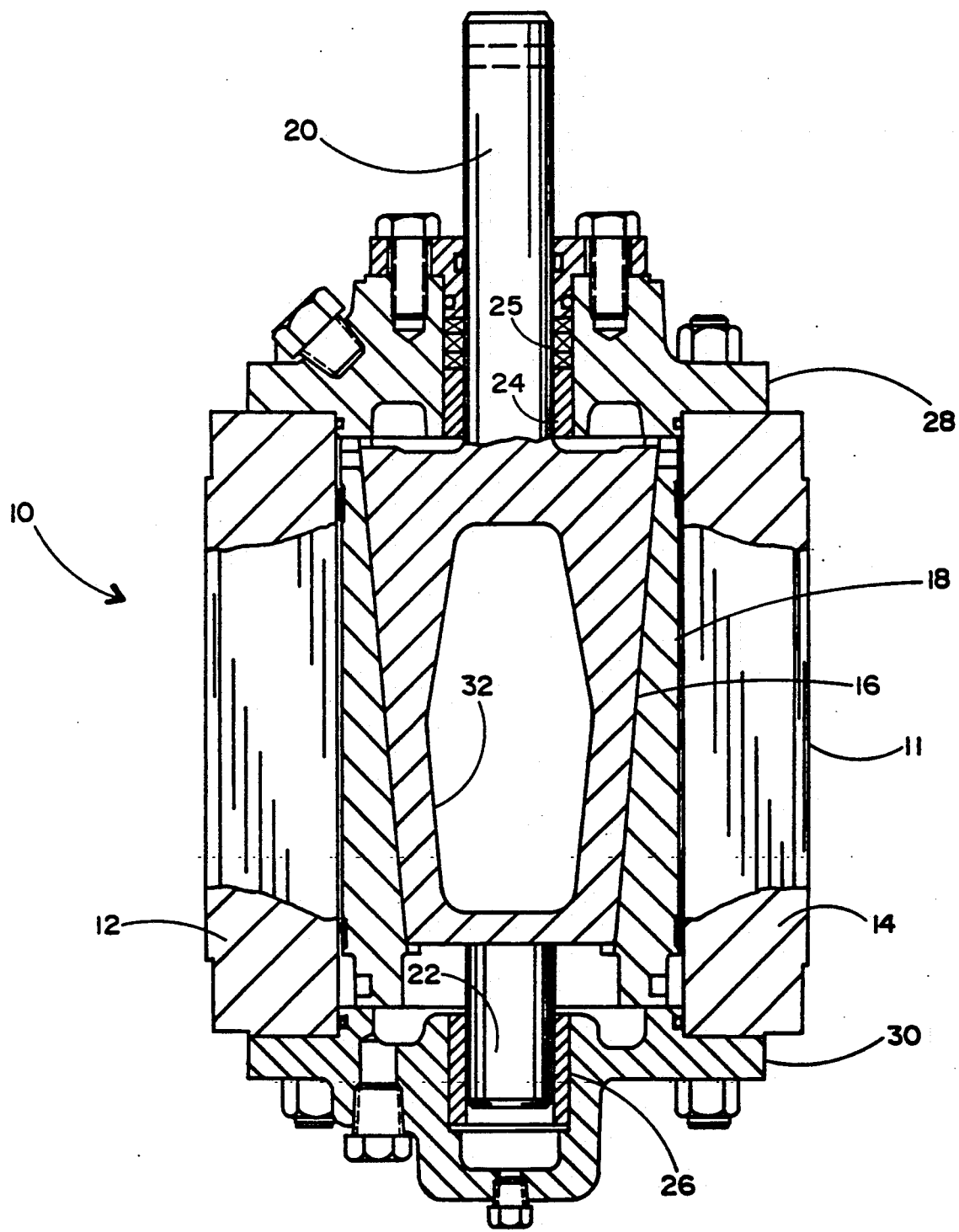
FIG. 1 is a cross-sectional view of a prior art retractable seal double block and bleed plug valve.

The present invention may be understood best by observing the specific differences between the preferred embodiment of the invention and the prior art. Accordingly, reference will first be made to FIGS. 1 and 2 which illustrate, respectively, a typical plug valve and a typical plug of the prior art. More specifically, it will be seen that a prior art plug valve 10 comprises a body 11, having an inlet 12 and an outlet 14. The flow of a fluid such as water between the inlet 12 and the outlet 14 may be controlled by the position of a plug 16 and a pair of slips 18. The plug 16 and slips 18 are interconnected for common rotational motion, but relative axial motion which, because of the complimentary wedge shape of the slips 18 and the adjoining surfaces of the plug 16, either increases or decreases the distance between the slips for either sealing the valve in a closed position or withdrawing the slips inwardly in the process of opening the valve. When the valve 10 is in a closed position, the slips 18 bear firmly against the inside surface of the inlet and outlet, as a result of the radial force of plug 16. In this configuration, a flow passage 32, which is oriented perpendicular to the slips in the plug 16, is positioned so that no fluid passes therethrough. Opening of the valve 10 requires a relative axial motion of the plug 16 in an upward direction for the configuration shown in FIG. 1, thereby pulling off the slips 18 from the interior surface of the inlet 12 and the outlet 15. The plug and slips are then rotated in order to align the flow passage 32 with the inlet 12 and the outlet 14 permitting fluid to flow therethrough. The axial and rotational motion of the plug 16 and the slips 18 is controlled by a stem or upper trunnion 20 which is, in turn, connected to an operator (not shown herein) which may be of a manual or motorized configuration. Such operators are well known in the art and need not be disclosed herein.

Figure 2:
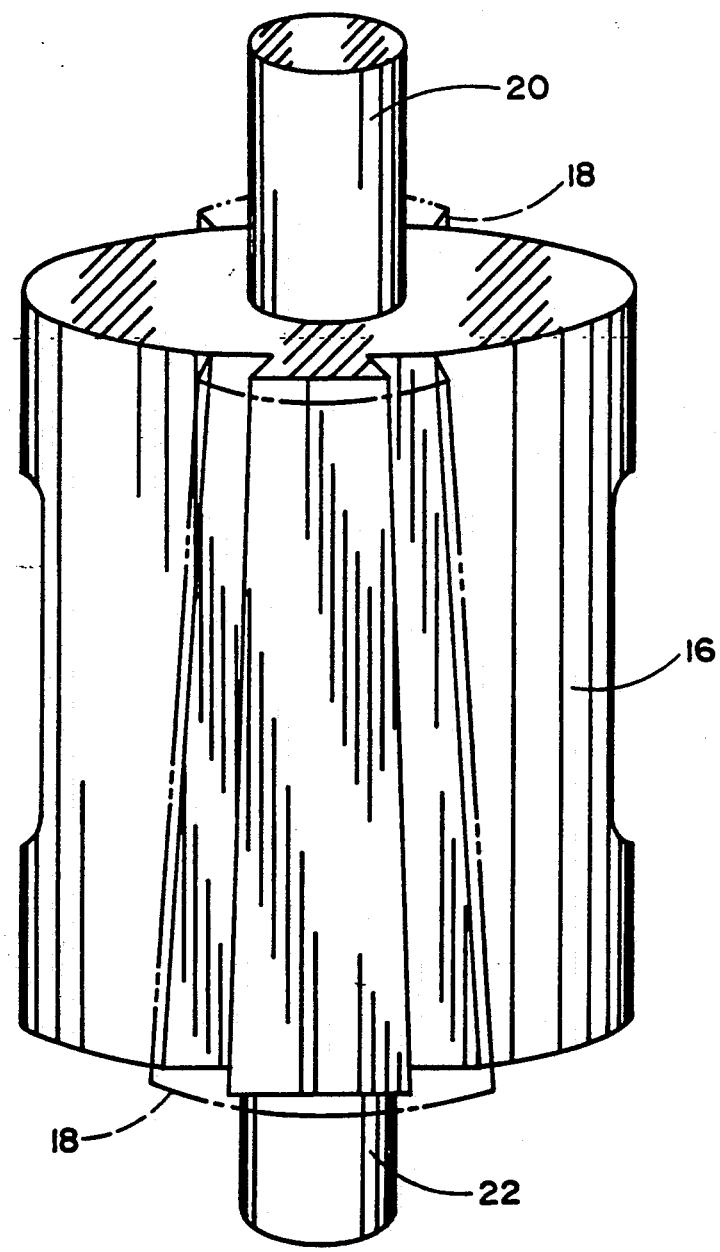
FIG. 2 is a cross-sectional view of a conventional prior art plug for such a valve.

In the conventional plug valve 10 of the prior art shown in FIG. 1, plug 16 not only provides a stem or upper trunnion 20, but also a lower trunnion 22. Trunnions 20 and 22 are designed to bear the load exerted on the plug by the fluid when the valve 10 is in its closed position. This load is transmitted to the body 11 by means of bushings 24 and 26 for the upper and lower trunnions, respectively. Bushing 24 provides a means of transferring the lateral loads of the plug against the bonnet 28 while still permitting the plug assembly to be rotated and moved axially for purposes of opening and closing in the manner described. Bushing 26 performs the same function with respect to the lower plate 30. Packing 25 is provided in order to seal off the fluid from the operator.

Because of the use of upper and lower trunnions and attendant bushings which bear and transmit loads to the bonnet and lower plate, the outside radial dimensions of plug 16 can be made smaller than the inside radial dimensions of the body 11. Consequently, no part of the plug surface comes in contact with the body at any time, whether the valve is in the open or closed position or is being moved in rotation or axially for opening or closing the valve 10.

Figure 3:
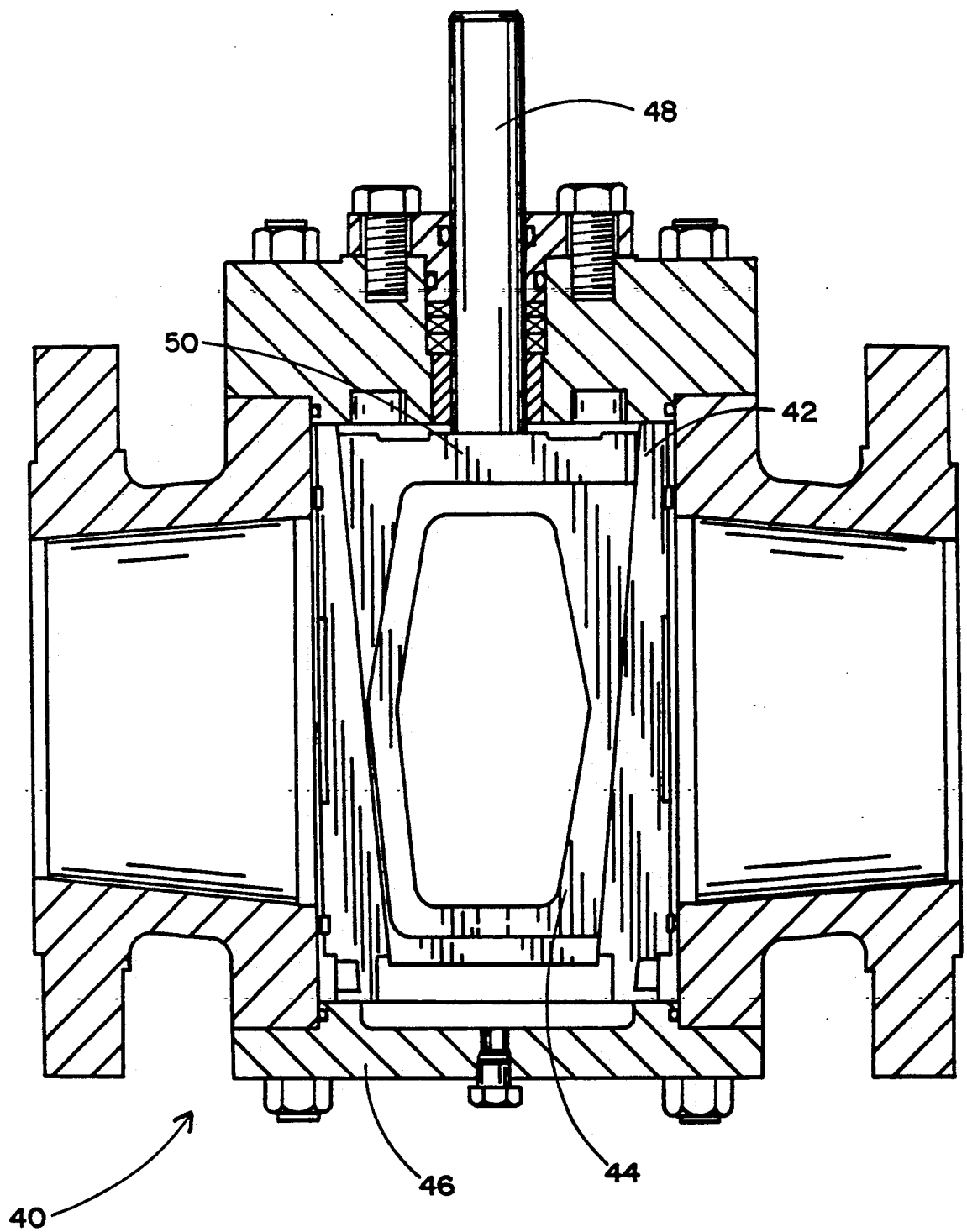
FIG. 3 is a cross-sectional view of a plug valve shown using the plug of the present invention.
Figure 5:
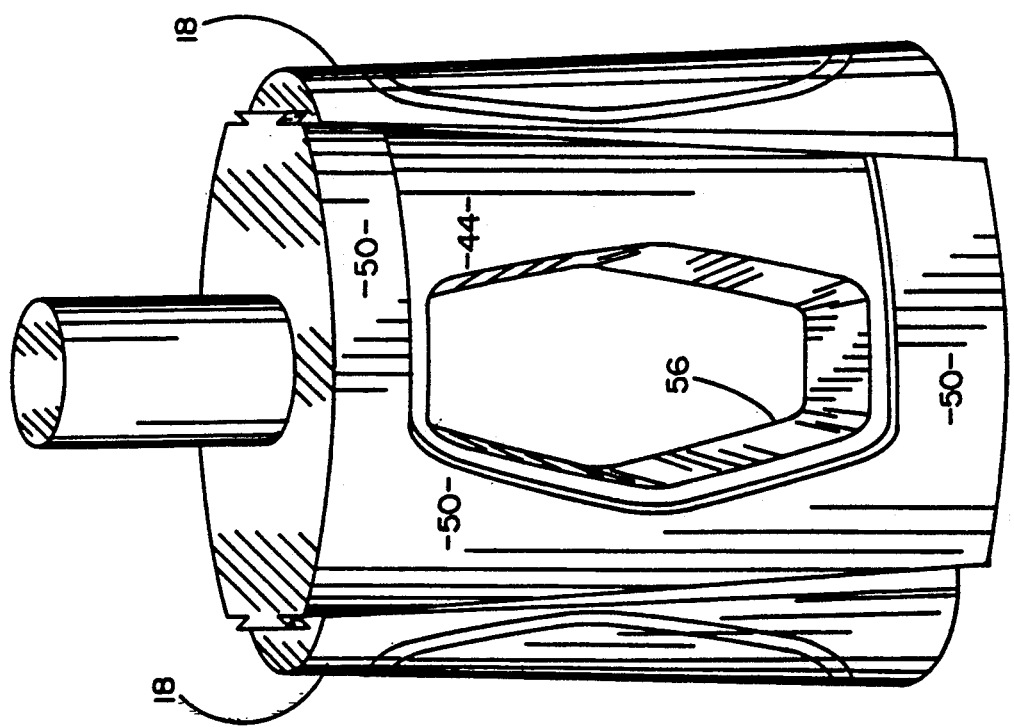
FIGS. 4 and 5 are front and side isometric views, respectively, of the improved plug of the present invention.
Figure 4:
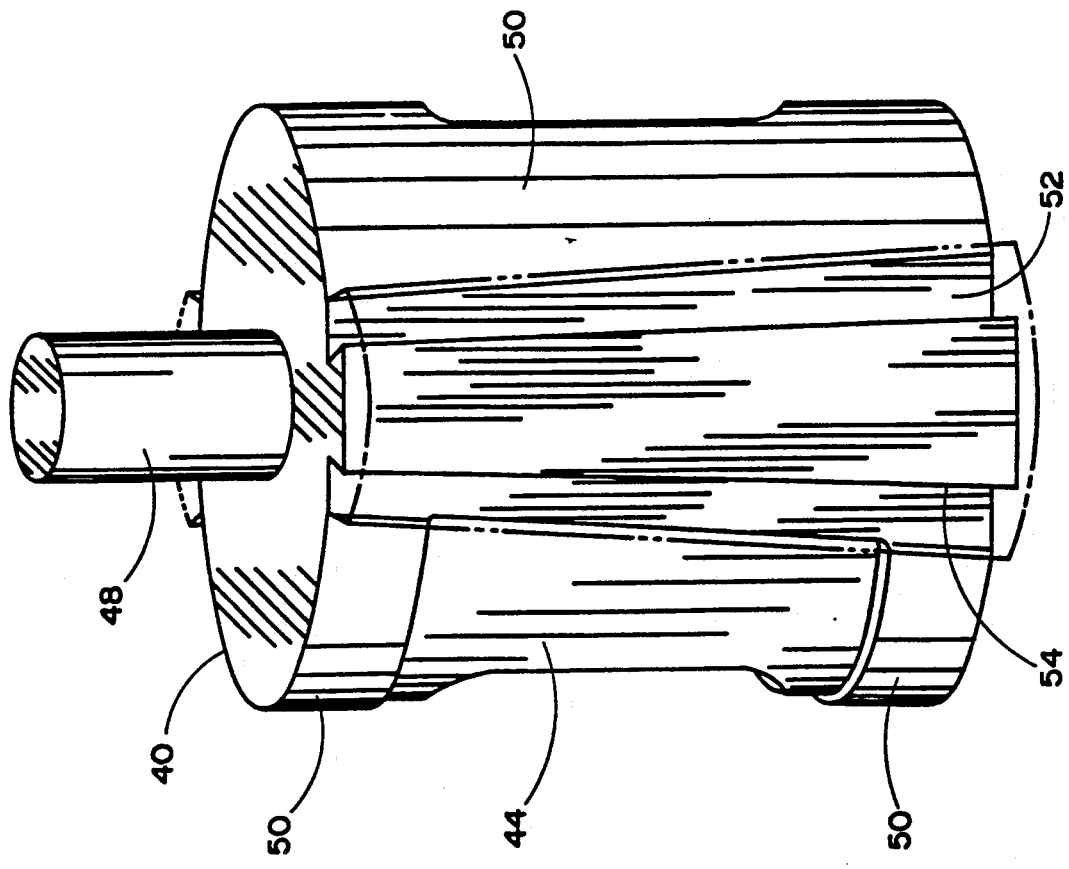

On the other hand, in referring to FIGS. 3, 4 and 5, it will be seen that the plug valve 40 of the present invention is uniquely configured and dimensions ed so that a plug 42 bears against the inside surface of the valve body along at least a portion of the radial surface. This constitutes a significant departure from the conventional design represented by the prior art valve 10 of FIG. 1. More specifically, it will be seen in FIG. 3, that the illustrated embodiment of the present invention comprises a plug valve 40 in which the plug 42 provides a plug bearing area 50 which, for the same size body of the valve of FIG. 1, is larger in radial circumference along at least a portion thereof so that there is an intentional contact between the plug 42 nd the surrounding interior surface of the body of plug valve 40. The slip engagement surface 52, the slip interface wedge 54 and the flow passage 56 are unchanged relative to the prior art plug valve 10 of FIG. 1. However, in the inventive plug configuration shown in FIGS. 3, 4 and 5, the plug 42 bears directly against the valve body and the prior art requirement for a lower trunnion and for bushings is obviated. There is still, of course, an upper trunnion or stem 48 which must be provided in order to transmit the axial and rotational motion to the plug 542 to accomplish opening and closing of the valve 40. However, stem 48 may be smaller than upper trunnion 20 of the prior art valve 10 of FIG. 1 because stem 48 does not have to bear any lateral forces. Furthermore, stem 48 may be made of a softer material or if made of the same material, need not be surface hardened, which is a requirement for upper trunnion 20 of the prior art valve. It will also be observed in comparing the prior art plug valve 10 of FIG. 1 with the inventive plug valve 40 of FIG. 3, that because there is no requirement for a lower trunnion in the latter, the lower plate 46 of plug valve 40 may be flat, thereby reducing the overall height of the valve.

The plug configuration of FIGS. 4 and 5 may optionally utilize a plug bearing area which constitutes virtually the entire radial surface of the plug 42 less the slip engagement surface 52 and the openings of flow passage 56. However, in the preferred embodiment of the invention illustrated herein, that portion of the radial surface of the plug 42 which comes in contact with the swept seating area of the slips 18 when the valve is opened, is relieved to provide a relieved area 44 seen best in FIGS. 4 and 5. Consequently in the preferred embodiment, the plug bearing are 50 constitutes the upper radial edges of the plug 42 on one side of the flow passage 56 and the entire radial surface of plug 42 along the opposite side of the flow passage 56. The relieved area 44 is provided on the side of the flow passage which would otherwise come in contact with the seating area of the slips 18 and thus helps to avoid scuffing of that area upon rotation of the plug which might otherwise detrimentally affect the sealing capability of the valve over a period of time. It will be understood that in a plug which can be rotated in either direction for opening the valve 40, it may be preferable to relieve the surface area of the plug immediately adjacent both sides of the passage 56. In any case, the advantages that result from the novel configuration of the plug of FIGS. 4 and 5 are both significant and numerous.

By way of example, one advantage is that the upper trunnion or stem 48 need no longer be structurally stiff in order to support the tremendous side loads seen by the trunnion in the prior art design. Furthermore, the stem or upper trunnion 48 is no longer a bearing surface and therefore need not be hardface. Another significant advantage is that the lower trunnion is completely obviated, thereby permitting the use of a hole or aperture in the lower plug area where the lower trunnion would otherwise have been located. Such a hole or aperture allows continuous purging of the lower body for expelling sediment that would otherwise be trapped therein, thereby increasing the life and operability of the unit. Another significant advantage is that there are no bushings, such as bushings 24 and 26 of the prior art plug valve 10 of FIG. 1. In addition, both the bonnet and lower plate may be made of a thinner material because neither the bonnet nor the lower plate is required to house a bushing. Perhaps most significantly, the lower plate may be flat, thereby reducing the overall height of the valve. Furthermore, the stem 48 may be small as compared to the upper trunnion of the prior art valve, thereby permitting better packing gland arrangement and improving valve sealing capability. In addition, because there is intimate contact between the plug 42 and the inside surface of the valve body, there is less flow area between the body and the plug. This feature helps the slips minimize short term throttle normally seen during each opening cycle. Furthermore, the plug is held more rigidly in place since the support of the plug is direct and this yields better pull-off of the slips during opening. Still another advantage of the present invention as compared to the prior art valve, is that the plug location is dictated by the body directly and not as a result of numerous other factors such as the position of the lower plate and bonnet and the bushings which control the location of the plug in the prior art valve. Another significant advantage is that the plug is a much larger bearing surface because it is much larger in diameter than the trunnions of the prior art valve and more bearing surface increases the wear life of the valve. And, as a least an interim consideration, prior art valves such as valve 10 of FIG. 1, may be retrofitted with the new plugs of FIGS. 4 and 5 with optional substitution of a flat lower plate for the lower plate of prior art valves such as valve 10 of FIG. 1. However, irrespective of whether the lower plate is also modified, the other advantages described herein can be achieved by simple substitution of the novel valve plug of the present invention for the prior art valve plug of FIG. 2.

It will now be understood that what has been disclosed herein comprises a novel self supporting, non-lubricated retractable seal double block and bleed plug valve wherein an improved plug configuration provides direct bearing surface support for the plug along at least a portion of the radial surface of the plug. The remaining radial surface of the plug may be optionally relieved to avoid scuffing the swept seating area of the interior valve body surface. By utilizing the novel plug configuration for direct plug bearing support, the present invention obviates the need for a lower trunnion and does away with the need for high load-bearing bushings. In all other respects, the operation of a plug valve, utilizing the plug of the present invention, remains substantially the same as it would be for a prior art plug valve. In fact, it is possible to substitute a novel plug configuration of the present invention for a prior art plug configuration for retrofitting existing valves of the type herein disclosed.

Those having skill in the art to which the present invention pertains, will now as a result of the applicant's teaching herein, perceive various modifications and additional which may be made to the invention. By way of example, the precise shape of the bearing surface area along the radial surface of the plug, as well as its overall size may be varied considerably depending upon the side loading requirements and other factors in the application of the valve. Furthermore, the novel features of the present invention are equally applicable to plug valves wherein the plug configuration is inverted as compared to the configurations disclosed herein wherein the axial motion of the plug for opening is in a downward direction as opposed to an upward direction as described herein above. In fact, the present invention, by obviating the requirement of the prior art for a lower trunnion, more readily facilitates the downward motion of an inverted plug because of the additional space available between the bottom of the plug and the lower plate. Accordingly, all such modifications and additions are deemed to be within the scope of the invention, which is to be limited only by the claims appended hereto.

We claim:

1. An improved double block and bleed plug valve of the type having retractable slips, a tapered cylindrical plug and a stem for opening and closing the valve by rotation of the plug to control the position of a passage through the plug and by axial movement of the plug to control the seating of the slips against an interior surface of a valve body for blocking and unblocking the inlet and outlet of the valve; the improvement comprising:

said plug having an outer diameter of at least a first portion of a radial surface thereof which is substantially equal to an inner diameter of said interior surface of said valve body adjacent said plug surface portion for radially supporting said plug within said valve body, said radial surface of said plug having a pair of second surface portions relieved relative to said first portion for spacing said second surfaces from said interior surface of said valve body, each of said pair of second surfaces being disposed adjacent an opening of said passage formed through said plug and extending on at least one side therefrom to a slip and defining a shoulder about said opening, thereby substantially preventing scuffing an interior surface portion of said valve body defining a seating area of said slip.

2. The improvement recited in claim 1 wherein said plug comprises said first portion along the uppermost and lowermost edges of said radial surface.

3. A valve plug of the type used in a retractable seal, double block and bleed valve wherein the plug is rotated and translated axially within the valve body bore upon opening and closing the valve; the plug comprising:

a generally cylindrical body having a radial surface and a pair of axial ends; said radial surface having a pair of opposed planar wedge-shaped sections for relative axial motion engagement with retractable seals; a flow passage extending through said plug substantially perpendicular to a rotative axis of said cylindrical body and located symmetrically between said wedge shaped sections; at least one bearing surface defined by a portion of said radial surface located adjacent one of said axial ends for engaging an adjacent surface of said valve body bore, said radial surface being further defined by a pair of recessed portions extending axially from said bearing surface, each of said pair of recessed portions forming a shoulder around a respective opening of said flow passage and extending circumferentially to at least one of said seals, thereby substantially preventing scuffing an interior surface portion of said valve body bore defining a seating area of said seals.

4. The valve plug recited in claim 3 comprising at least two of said bearing surfaces; one of said two bearing surfaces being located adjacent one of said axial ends of said cylindrical body and the other of said two bearing surfaces being located adjacent the other of said axial ends of said cylindrical body.

* * * * *